United States Patent
Otoguro (10) Patent No.: US 8,724,199 B2
(45) Date of Patent: May 13, 2014

(54) OPTICAL SCANNING APPARATUS INCLUDING MECHANISM FOR SHIELDING LENS FROM AIR FLOW

(75) Inventor: Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 12/831,019

(22) Filed: Jul. 6, 2010

(65) Prior Publication Data

US 2011/0013248 A1    Jan. 20, 2011

(30) Foreign Application Priority Data

Jul. 14, 2009    (JP) ................................. 2009-165567

(51) Int. Cl.
*G02B 26/10* (2006.01)

(52) U.S. Cl.
USPC .................................. 359/216.1; 359/207.11

(58) Field of Classification Search
None
See application file for complete search history.

(56) References Cited

U.S. PATENT DOCUMENTS

| | | | |
|---|---|---|---|
| 2006/0017996 A1* | 1/2006 | Tamaru | 359/204 |
| 2006/0023283 A1* | 2/2006 | Morimoto et al. | 359/205 |
| 2006/0209376 A1* | 9/2006 | Yamakawa et al. | 359/216 |

FOREIGN PATENT DOCUMENTS

JP    9-197330 A    7/1997

* cited by examiner

*Primary Examiner* — Stephone B Allen
*Assistant Examiner* — Jyotsna Dabbi
(74) *Attorney, Agent, or Firm* — Canon USA Inc. IP Division (57) ABSTRACT

An optical scanning apparatus includes a deflecting device for scanning and deflecting a light beam, a first optical member onto which reflected light from the deflecting device is incident, a wall disposed between the first optical member and the deflecting device, a mirror that reflects the light beam having passed through the first optical member, a second optical member disposed above the deflecting device to guide and form an image of reflected light from the mirror on a surface to be scanned, a supporting member supporting the second optical member and having at least one bent portion, and a housing. The bent portion of the supporting member is disposed above the deflecting device in a position nearer to the deflecting device than the wall face in a direction perpendicular to the deflecting face of the deflecting device so that a flow of air produced by the deflecting device is branched.

8 Claims, 5 Drawing Sheets

FRAGMENTARY VIEW TAKEN IN DIRECTION OF ARROW S

OPTICAL SCANNING APPARATUS INCLUDING MECHANISM FOR SHIELDING LENS FROM AIR FLOW

BACKGROUND OF THE INVENTION

1. Field of the Invention

The present invention relates to an optical scanning apparatus used in an image forming apparatus such as a copying machine, printer, facsimile machine, or a multifunction peripheral.

2. Description of the Related Art

An optical scanning apparatus used in an electrophotographic image forming apparatus deflects a beam of light emitted from a light source with an optical deflector, and condenses the light beam towards a surface to be scanned with a scanning and image forming optical system to thereby form an optical spot on the surface to be scanned. An optical scanning apparatus is well known that is configured to form a latent image on a surface to be scanned by executing an optical scan of the surface to be scanned with the optical spot.

This type of scanning and image forming optical system generally includes at least one fθ lens. An fθ lens is a lens designed to provide a flat field on the surface of the image plane to be scanned. The fθ lens generally adopts a specific lens effective surface such as an aspherical surface for the purpose of improving scanning characteristics.

A resin lens is often used as the fθ lens due to advantages including simple formation of the above type of specific surface and cost-effective manufacture. In particular, since many lenses are used in a tandem image forming apparatus, considerable cost reduction is realized by use of resin lenses.

On the other hand, when compared to a glass lens, a resin lens tends to undergo thermal expansion due to increased temperature, and consequently, unintended distortion of light rays may occur.

An optical deflector is often realized by a rotational polygon mirror that rotates a deflection reflection surface that is driven by a rotational driver.

When driving the deflection reflection surface of the rotational polygon mirror, temperature increase may result from the heat generated by the driving components such as a motor. Thus when the optical scanning is continuously executed over a long period of time, the bearing portion of the rotation shaft for the rotational polygon mirror or the IC chips in the motor unit for driving the rotational polygon mirror may reach a substantially high temperature.

Even during short optical scanning operations, since temperature increase varies as a logarithmic function immediately after starting the rotation, a distorting temperature increase in an inner portion of the optical scanning apparatus has a large effect on the distortion of light rays.

The fθ lens and the rotational polygon mirror forming the optical scanning apparatus are housed in an inner portion of an optical box. When the temperature of the rotational polygon mirror or the electronics for controlling the motor increases, the resulting heat creates a convection current of hot air in the optical box and the hot air is transmitted to the optical box as convective heat. In addition, a flow of high-temperature air created by the rotation of the rotational polygon mirror impacts on the fθ lens, at least partially.

Consequently, a relative temperature difference is generated on the fθ lens, and the resulting partial thermal expansion causes a distortion of the optical surface. As a result, a distortion in the scanning light flux is produced, and causes a lack of uniformity in a scanning speed or image forming characteristics to cause deterioration in the image such as unevenness or streaking. Particularly, in a tandem image forming apparatus a problem occurs in which deviations of positions, in product colors, are generated caused by changes in the position of a light beam for each color.

To solve the above problems, an optical scanning apparatus has been proposed that reduces the effect of heat produced by the rotational polygon mirror. For example, the optical scanning apparatus discussed in Japanese Patent Application Laid-Open No. 9-197330 is configured in such a manner that a glass cover or the like covers a deflecting device or an optical member so that heat from a deflecting device or the like is not transmitted to an optical member. The optical scanning apparatus discussed in Japanese Patent Application Laid-Open No. 9-197330 considers a light beam that scans a single light-sensitive drum.

Figure 5A:
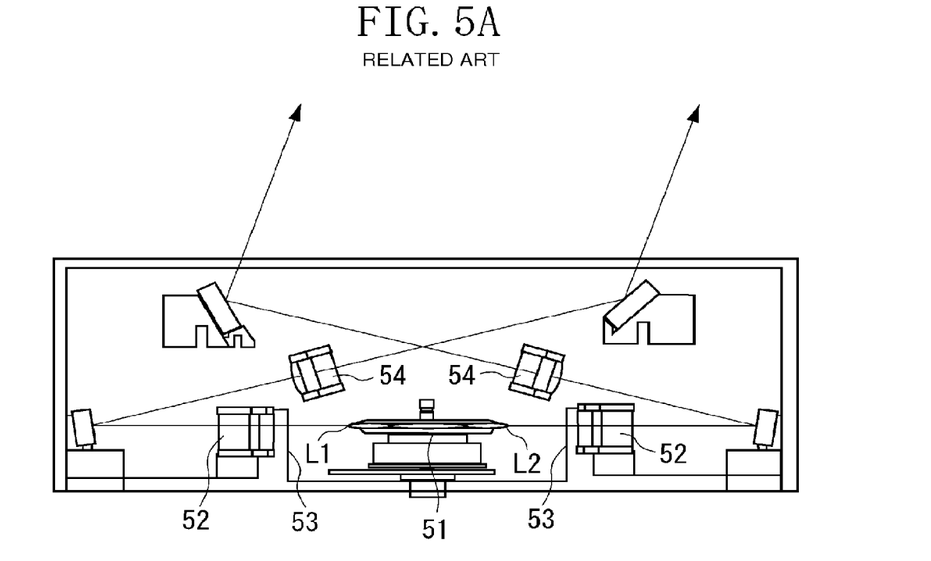
FIGS. 5A and 5B illustrate an optical scanning apparatus of an opposed scanning type.
Figure 5B:
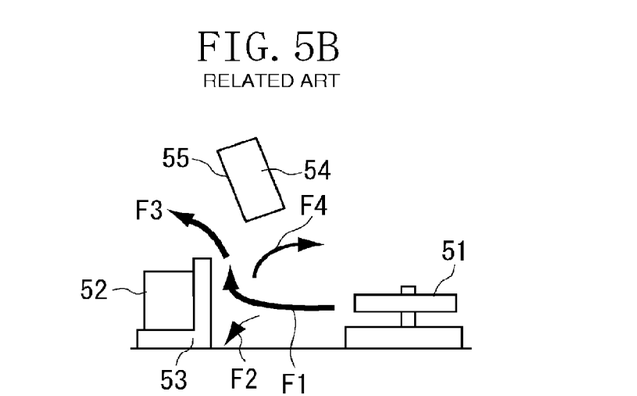

However, an optical scanning apparatus of an opposed-scanning system, as illustrated in FIGS. 5A and 5B, that deflects and scans laser light L1 and L2 to expose a plurality of light-sensitive drums using a single polygon mirror 51 entails additional problems.

Specifically, when the polygon mirror 51 is rotated, a flow of air is generated. The air flow collides against a vertical wall 53 provided to prevent flare light from entering an optical lens 52, and is divided into air flows F1 and F2. The air flow F1 is further divided into air flows F3 and F4 by an optical lens 54 positioned on an upper portion of the polygon mirror 51.

Since the air flow such as the air flow F3 or F4 that contains heat generated by rotation of the polygon mirror 51 diffuses in the optical scanning apparatus, the heat distribution in the optical scanning apparatus is reduced. In this manner, thermal expansion of a part in the optical scanning apparatus is suppressed and color deviation can be effectively avoided.

However, the optical lens 54 may undergo thermal expansion as a result of the air flow F3 colliding against the laser light incidence plane 55 of the optical lens 54.

To solve this problem, when a method discussed in Japanese Patent Application Laid-Open No. 9-197330 is used in a configuration in which heat is not transmitted to an optical lens, since an optical flux passes through optical members including glass that is not required to condense the optical flux on the surface to be scanned, the laser beam is affected by a distortion or the like of the surface thereof. As a result, there is a high possibility of problems including distortion in the scanning beams or failure of the optical spot.

SUMMARY OF THE INVENTION

The present invention is directed to an optical scanning apparatus capable of minimizing an amount of deformation caused by temperature increase in a lens caused by heat from a heat producing body without adding a member that adversely affects image forming performance.

According to an aspect of the present invention, an optical scanning apparatus includes a light source emitting a light beam, a deflecting device including a rotational polygon mirror that deflects and scans a light beam from the light source, and a drive unit that rotates and drives the rotational polygon mirror, a first optical member onto which reflected light from the deflecting device becomes incident, a wall face disposed between the first optical member and the deflecting device, a reflection mirror that reflects a light beam that has passed through the first optical member, a second optical member disposed above the deflecting device to guide and form an image of reflected light from the reflection mirror on a surface to be scanned, a first shielding portion disposed between the deflecting device and the second optical member in a direction of scanning of a light beam by the deflecting device, and a second shielding portion including a port allowing transmission of a light beam, disposed on the incident side of light beams on the second optical member in a direction of scanning of a light beam by the deflecting device. The first shielding portion and the second shielding portion are connected so that an air flow produced by the deflecting device branches.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DESCRIPTION OF THE EMBODIMENTS

Various exemplary embodiments, features, and aspects of the invention will be described in detail below with reference to the drawings.

Figure 1:
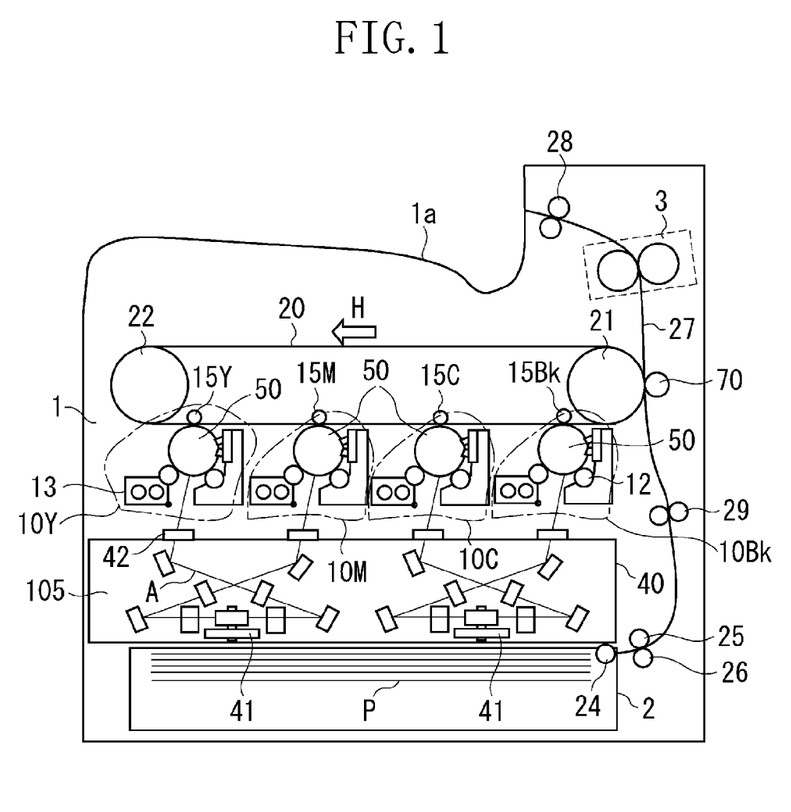
FIG. 1 illustrates a configuration of an image forming apparatus including an optical scanning apparatus according a first exemplary embodiment of the present invention.

FIG. 1 illustrates an entire configuration of a tandem color laser beam printer (image forming apparatus) including an optical scanning apparatus according to the present invention.

The laser beam printer includes four imaging engines 10Y, 10M, 10C, 10Bk each forms a toner image of yellow, magenta, cyan, and black. The laser beam printer includes an intermediate transfer belt (ITB) 20, on which toner images produced by the image engines are primary transferred in a superposed manner. The laser beam printer is configured to form a full-color image by a secondary transfer on a recording sheet P.

The intermediate transfer belt 20 is an endless belt that is stretched around a pair of belt conveyance rollers 21 and 22, and is configured to receive a primary transfer of a toner image formed by the imaging engines 10Y, 10M, 10C, 10Bk while rotated in the direction of the arrow H.

A secondary transfer roller 70 is disposed in a position facing the belt conveyance roller 21, so as to sandwich the intermediate transfer belt 20 therebetween. The recording sheet P is passed between the secondary transfer roller 70 and the intermediate transfer belt 20, which are in press contact state, and thereby receives a secondary transfer of a toner image from the intermediate transfer belt 20.

The four imaging engines 10Y, 10M, 10C, 10Bk described above are arranged in sequence on a lower side of the intermediate transfer belt 20 and execute a primary transfer of a toner image formed according to image information for each color on the intermediate transfer belt 20. The four imaging engines 10Y, 10M, 10C, 10Bk are disposed in the sequence of yellow 10Y, magenta 10M, cyan 10C, and black 10Bk along a rotation direction of the intermediate transfer belt 20.

An optical scanning apparatus 40 that exposes a photosensitive drum 50 disposed in each imaging engine according to image information is disposed below the imaging engines 10Y, 10M, 10C, 10Bk. The optical scanning apparatus 40 is used for all of the imaging engines 10Y, 10M, 10C, 10Bk in common.

The optical scanning apparatus 40 includes four semiconductor lasers (not illustrated) that produce a laser beam A (optical beam) that is modulated according to the image information for each color, and a rotational polygon mirror unit (deflecting device 41) that scans the four laser beams A along an axial direction of the photosensitive drum 50. The rotational polygon mirror unit 41 includes a rotational polygon mirror and a drive motor (drive unit) that rotates and drives the rotational polygon mirror.

Each laser beam A deflected and scanned by the deflecting device 41 is guided by an optical member disposed in the optical scanning apparatus and propagates on a predetermined path. Thereafter, the laser beam A passes through an illumination port 42 provided on an upper portion of the optical scanning apparatus 40 to thereby expose the photosensitive drum 50 for each imaging engine 10Y, 10M, 10C, 10Bk.

Each imaging engine 10Y to 10Bk includes a photosensitive drum 50, a charging roller 12 configured to charge the photosensitive drum 50 to a uniform potential, and a developing device 13 that develops an electrostatic latent image formed on the photosensitive drum 50 by the exposure light of the laser beam A to thereby form a toner image. The toner image is formed on the photosensitive drum 50 according to image information for each color. A two-component developer that is a mixture of toner and a carrier is used in the developing device 13.

Primary transfer rollers 15Y, 15M, 15C, 15Bk sandwiching the intermediate transfer belt 20 are disposed at positions facing the photosensitive drums 50 for imaging engine 10Y, 10M, 10C and 10Bk, respectively. The application of a predetermined transfer bias voltage to the primary transfer rollers 15Y, 15M, 15C, 15Bk forms an electrical field between the photosensitive drums 50 and the transfer rollers 15Y, 15M, 15C and 15Bk, and thereby a toner image carrying an electrical charge on the photosensitive drum 50 is transferred onto the intermediate transfer belt 20 due to a Coulomb force.

The recording sheet P is supplied to an inner portion of the printer from a sheet cassette 2 housed in a lower portion of a printer housing 1. More specifically, the recording sheet P is supplied to a secondary transfer position at which the intermediate transfer belt 20 and the secondary transfer roller 70 are in contact.

The sheet cassette 2 is placed in a lower portion of the printer housing 1 by being pressed from a side of the printer housing 1. A pick-up roller 24 and a feed roller 25 for drawing out a recording sheet P are disposed in parallel to each other in an upper portion of the sheet cassette 2. A retard roller 26 for preventing double feed of the recording sheets P is disposed in a position facing the feed roller 25.

A sheet conveyance path 27 for the recording sheet P in an inner portion of the printer is disposed in a substantially vertical orientation along a side face (right side in FIG. 1) of the printer housing 1. The recording sheet P, which is drawn from the sheet cassette 2 positioned in the bottom portion of the printer housing 1, passes upwardly along the sheet conveyance path 27 and is sent to a registration roller 29 that controls the protrusion timing of the recording sheet P relative to the secondary transfer position. Thereafter, when transfer of the toner image at the secondary transfer position has been executed, the recording sheet P is sent to a fixing device 3 located immediately above the secondary transfer position.

The recording sheet P with a toner image thereon fixed by the fixing device 3 passes through the discharge roller 28 and is discharged into a discharge tray 1a provided in an upper portion of the printer housing 1.

For the formation of a full-color image by the color laser beam printer configured as described above, firstly the optical scanning apparatus 40 executes exposure of the photosensitive drum 50 of each imaging engine 10Y, 10M, 10C, 10Bk at a predetermined timing, according to image information for each color.

In this manner, a toner image according to image information is formed on the photosensitive drum 50 for each imaging engine 10Y, 10M, 10C, 10Bk. However, the creation of an image having superior imaging quality requires highly accurate reproduction of positions in the latent image created by the optical scanning apparatus.

Figure 2A:
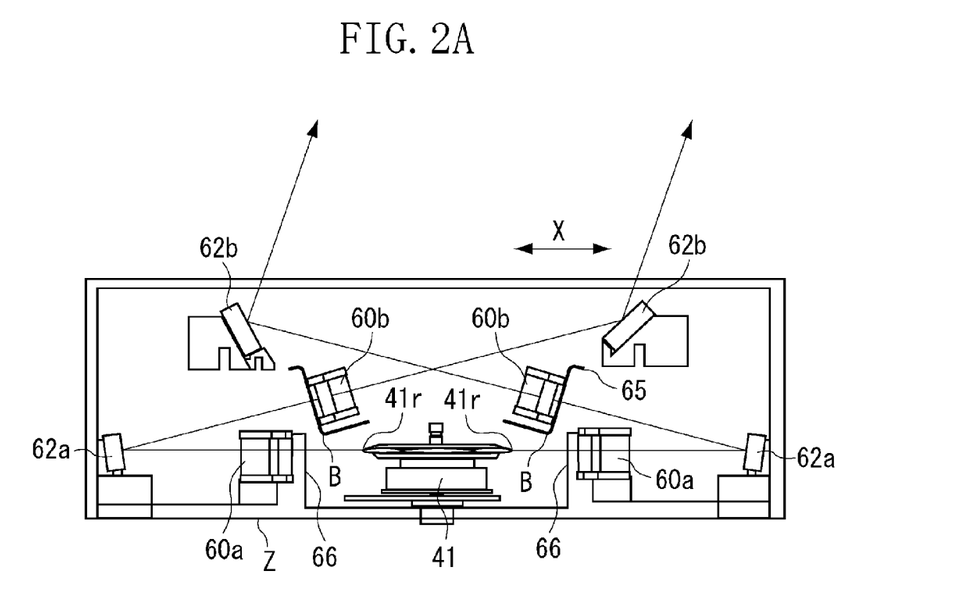
FIGS. 2A and 2B illustrate a configuration of the optical scanning apparatus according to the first exemplary embodiment of the present invention.
Figure 2B:
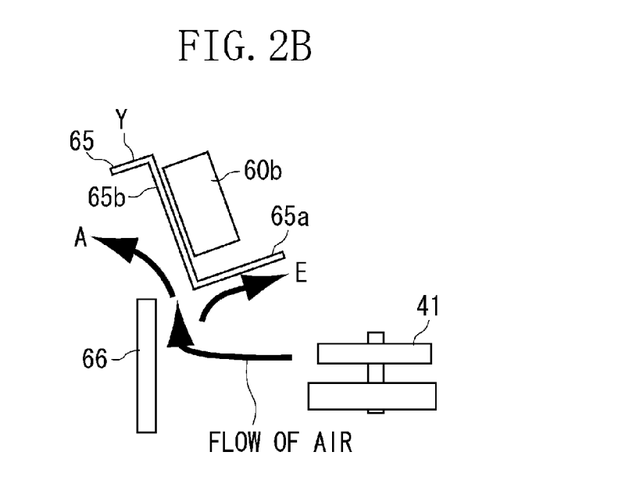

FIGS. 2A and 2B are schematic configuration diagrams of an optical scanning apparatus according to the present invention. The optical scanning apparatus employs an opposed-scanning system in which exposure with laser light is executed from below the photosensitive drum as illustrated in FIG. 1. In other words, in the optical scanning apparatus according to the present exemplary embodiment, at least a portion of the optical path for laser light is positioned on the opposite side, with respect to the rotational polygon mirror, of the surface on which the rotational polygon mirror is disposed.

A light source unit (not shown) mounting a light source that emits laser light (optical beam) and a deflecting device 41 reflecting and deflecting the laser light are provided on an outer peripheral portion and an inner portion, respectively, of the optical scanning apparatus. A supporting member 65 that supports a second lens 60b that guides laser light onto a surface to be scanned and forms an image is also provided.

The reflected light reflected and deflected by a deflection face 41r of the deflecting device 41 passes through a first lens 60a (first optical member) and is reflected by a first reflecting mirror 62a to enter the second lens 60b (second optical member) that is positioned above the deflecting device 41. The second lens 60b guides the light beam reflected by the first reflecting mirror 62a towards a surface to be scanned (photosensitive drum 50 in FIG. 1) via a second reflecting mirror 62b, so as to form an image on the surface to be scanned. The disposition of the second lens 60b above the deflecting device 41 characterizes the above-described optical scanning apparatus employing an opposed-scanning system.

The above-described configuration enables effective use of the space in the inner portion of the optical box 105 in FIG. 1. Specifically, by using the first reflecting mirror 62a to guide folded back optical flux again towards the space above the deflecting device 41 to thereby utilize the space in the upper portion of the deflecting device, the above-described configuration enables the optical scanning apparatus to be downsized.

In a configuration in which an optical member is disposed in the space in the upper portion of the deflecting device, the scanning light does not need to be returned to the deflecting device itself, and a large hole is not necessary for passing the light beams on the portion of the seating face in the optical box supporting the deflecting device. In this manner, it is possible to downsize the apparatus without reducing the rigidity of the optical box.

In a conventional optical scanning apparatus used in an image forming apparatus, heat from a driving IC chip and heat from bearing portions are produced when the deflecting device is driven. This heat has typically caused deformation and malfunction of optical components due to heating of a localized space as a result of air flow caused by operation of the deflection device.

Since heat effects cause distortion of scanning line and optical spot failure, they need to be improved. Furthermore, downsizing as described above means that the effect of such heating is extremely large in a configuration for an optical scanning apparatus in which optical components are disposed in the vicinity or in an upper portion of a deflecting device.

A light shielding wall 66 as illustrated in FIG. 2A is disposed between the deflecting device and the first lens 60a, and is formed by a portion of the optical box. The light shielding wall 66 is configured to block a path of flare light in order to prevent unintended light reflected by the surface of the optical member (flare light) that is not required for the formation of an image, from reaching the surface to be scanned, or in order to reduce an amount of flare light.

The supporting member 65 supports and fixes the second lens 60b.

The supporting member 65 is positioned in an inner portion of the optical box and above the deflecting device 41. More specifically, the supporting member 65 is supported and fixed on the optical box in an area in which scanning light for forming an image does not pass.

Figure 3A:
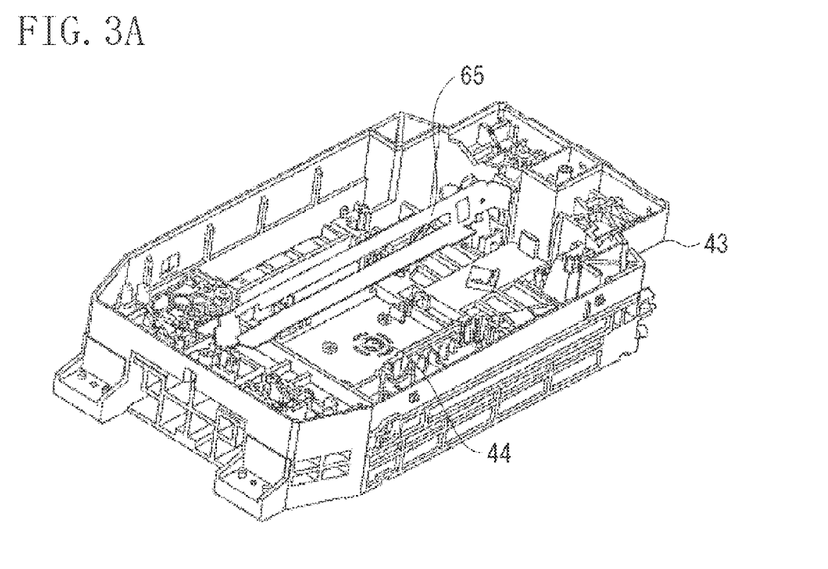
FIGS. 3A and 3B is a perspective view of the optical scanning apparatus according to the first exemplary embodiment of the present invention.
Figure 3B:
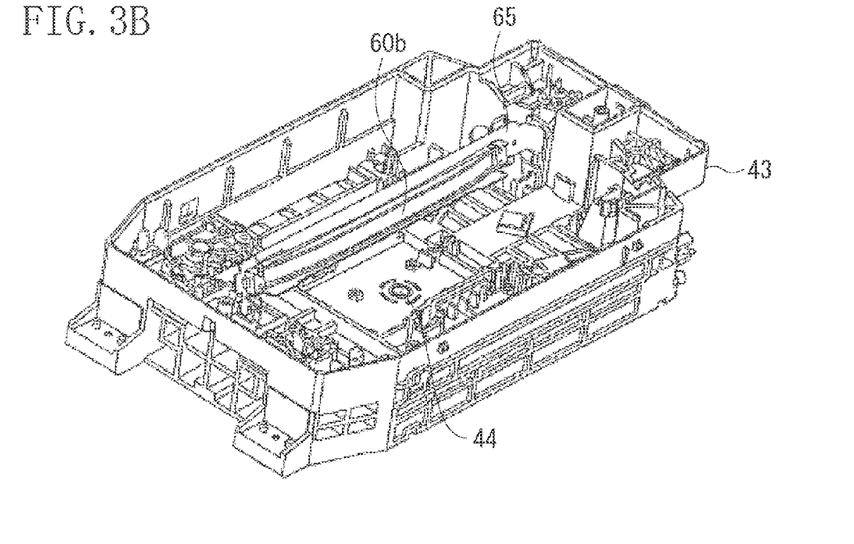

FIGS. 3A and 3B are perspective views illustrating an optical scanning apparatus according to the present exemplary embodiment. FIG. 3A illustrates the optical scanning apparatus before mounting the second lens 60b on the housing 43. FIG. 3B illustrates the optical scanning apparatus after mounting the second lens 60b on the housing 43. As illustrated in FIG. 3A, both longitudinal sides of the supporting member 65 are brought into contact with and supported by the housing 43 of the optical scanning apparatus. The second lens 60b is mounted on the supporting member 65 as illustrated in FIG. 3B. The deflecting device 41 is attached in an engagement hole 44 as illustrated in FIGS. 3A and 3B.

Turning back to FIG. 2B, it is illustrated therein that the supporting member 65 has a first shielding portion 65a and a second shielding portion 65b. Both shielding portions are disposed so that air flow caused by heat produced by rotation of the deflecting device 41 does not impinge on the second lens 60b. The first shielding portion 65a is disposed between the deflecting device 41 and the bottom face of the second lens 60b. The second shielding portion 65b is disposed on the incident face side of the second lens 60b.

A curved portion B is formed between the first shielding portion 65a and the second shielding portion 65b. The first shielding portion 65a and the second shielding portion 65b are connected along the main scanning direction (the direction of scanning of laser light) to form the supporting member 65 (shielding member).

In the present exemplary embodiment, although an example is described in which the first shielding portion 65a and the second shielding portion 65b are formed as a single member and the second shielding portion 65b is bent from the first shielding portion 65a, both shielding portions may be formed by connecting separate members. However, when the supporting member 65 is formed with one member by bending it to form the curved portion B, manufacturing of the supporting member is simplified since a connecting process for the two shielding members in the scanning direction is not required.

An opening (not shown) for allowing the laser beam to pass therethrough is provided in the second shielding portion 65*b*.

The supporting member 65 is configured with a shape that includes at least one bent portion B (connection portion of the first shielding portion 65*a* and the second shielding portion 65*b*), and is disposed at a position that is closer to the deflecting device 41 than the light shielding wall 66 in a direction perpendicular to the deflection face 41*r* of the deflecting device 41 (the direction X illustrated by an arrow). A portion of the surface extending from the bent portion B of the supporting member 65 is positioned below the second lens 60*b*.

Heat caused by the operation of the drive motor of the deflecting device 41 blows out in a circumferential direction by the rotation of the polygonal mirror. However, since the polygon mirror is shielded by the shielding wall 66 and the bottom face Z of the optical box that are disposed around the drive motor, a large portion of the heat flows upwards above a portion proximate to the shielding wall 66, and impinges on the supporting member 65.

As described above, since the bent portion B of the supporting member 65 is disposed closer to the deflecting device 41 than the wall face, the air flow blown by the polygon mirror branches into two flows. A first flow is directed in a direction A towards the end portion of the optical box, and a second flow is directed in a direction E towards an upper portion of the deflecting device 41 as illustrated in FIG. 2B. That is, the supporting member 65 (shielding member) includes at least two shielding portions (65*a* and 65*b*) joined substantially orthogonal to each other by a bent portion B, and directs the airflow blown by the polygon mirror away from the second lens 60*b*. A portion of the air guided in the direction A (a portion of the first flow) is further guided towards the direction of the optical box end portion by an additional bent portion Y formed on the supporting member 65.

In this manner, since the supporting member 65 prevents the heated air blown from the heat source (the drive motor of the deflecting device 41) from impinging directly on the second lens 60*b*, problems, such as partial warming of the lens resulting in distortion of the lens due to a thermal distribution difference therein and bending of the scanning beam, are effectively avoided. Furthermore, problems including fluctuations in an irradiating position due to the shift of the lens, inclination variation, or magnification variation resulting from deviation of the lens position can be considerably mitigated. As a result, it is possible to reduce distortion in the scanning light beam and fluctuations in an irradiating position.

Since the direction of flow of heated air is branched and a portion thereof is guided outside of the optical box, a difference in the temperature distribution of the optical box inner portion can also be reduced. In this manner, a reduction in deformation of a part of the optical box is obtained and, as a result, it is possible to greatly reduce distortion in the scanning light beam and fluctuations in an irradiating position.

In the configuration of the present exemplary embodiment, a partial temperature difference is Δ2.2° C. in the optical components when a section between the heat source and the optical components is not shielded by the supporting member 65, and a partial temperature difference is Δ0.5° C. when shielded.

Generally when a temperature distribution exists in optical components of an optical scanning apparatus, it is known that there is a high possibility that problems will arise due to fluctuations in an irradiating position even when the partial temperature difference is Δ1.0° C. This fact the above described shielding of the lens can achieve a partial temperature difference of as low as Δ0.5° C. indicates the large effect can be obtained by the present exemplary embodiment.

Figure 4A:
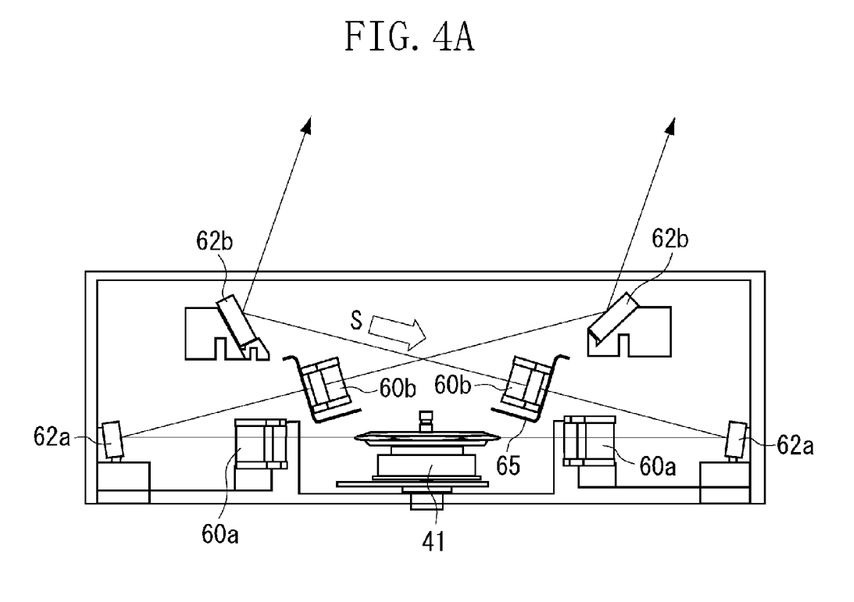
FIG. 4A illustrates a configuration of the optical scanning apparatus according to a second exemplary embodiment of the present invention.
Figure 4B:
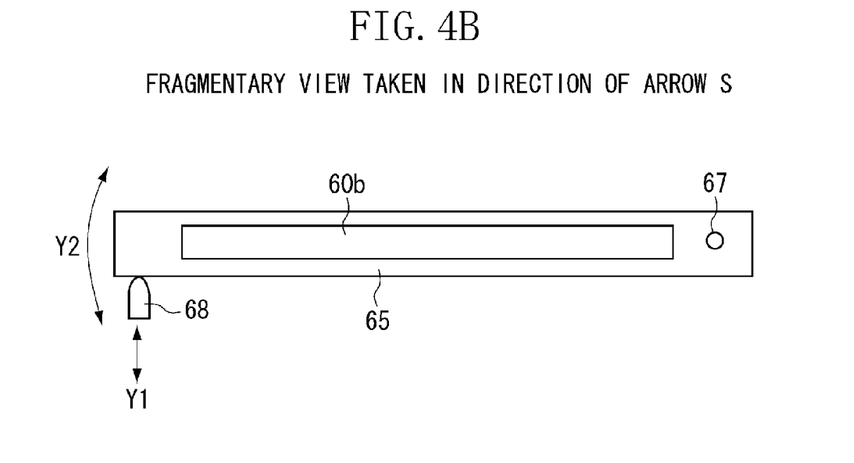
FIG. 4B illustrates a configuration of a supporting member in the optical scanning apparatus according to the second exemplary embodiment of the present invention.

FIG. 4 is a schematic diagram illustrating the optical scanning apparatus according to a second exemplary embodiment of the present invention.

In the present exemplary embodiment, the supporting member is configured using a material having a higher coefficient of thermal conductivity than the optical box. More specifically, the supporting member 65 is formed with a metallic material, which is surface-processed, using an iron material. This configuration enables heat originating in the drive motor, which is the heat source to be transmitted, efficiently from a position near the drive motor to a position farther therefrom.

In other words, a greater reduction in the temperature difference between the center and the end portion of the inner portion of the optical scanning apparatus than when a supporting platform is formed integrally with the optical box. Therefore in addition to the effect enabled by the first exemplary embodiment, a large reduction in fluctuations in an irradiating position can be achieved.

The supporting member 65 is configured to be rotatable in the direction Y2 illustrated by the arrow in FIG. 4B in a plane perpendicular to the optical axis of the lens with the second lens 60*b* supported and fixed. Furthermore, the supporting member 65 includes an axial member 67 that forms the rotational center for the rotation operation described above.

A pressing member 68 can be place in contact with an end of the supporting member 65. The pressing member 68 can be displaced in the direction Y1 illustrated by the arrow Y1 in FIG. 4B by a driving force of a motor or the like (not illustrated) to thereby apply pressure onto the supporting member 65. Thus, the supporting member 65 and the second lens 60*b* are rotated together about the axial member 67.

In this manner, the relative inclination of the lens to the scanning beam incident upon the lens is changed, and the light beam passing through the lens varies that direction with respect to each longitudinal position of the lens. In other words, the inclination of the scanning beam on the image bearing member can be varied.

This configuration enables correction of fluctuations in an irradiating position produced by a deviation in the relative inclination of the optical scanning apparatus and the image bearing member, or in the fluctuations in an irradiating position produced by a temperature change in the apparatus.

When the supporting member 65 is displaced to correct an irradiating position by displacing the supporting member 65 while maintaining a positional relationship with the lens, problems, in which the temperature distribution of the lens may be changed, can be avoided.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-165567 filed Jul. 14, 2009, which is hereby incorporated by reference herein in its entirety.

What is claimed is:

1. An optical scanning apparatus comprising:
a light source configured to emit a light beam;
a deflecting device disposed on a surface of the optical scanning apparatus, the deflecting device including a rotational polygon mirror that deflects the light beam from the light source such that a photosensitive member is scanned with the light beam deflected by the rotational polygon minor, and a drive unit that rotates the rotational polygon mirror;
a first lens configured to pass therethrough the light beam deflected by the rotational polygon mirror;
a wall disposed between the first lens and the deflecting device;
a reflection mirror configured to reflect the light beam that has passed through the first lens;
a second lens disposed between the deflection device and the wall in a direction perpendicular to a rotation shaft of the rotational polygon minor and disposed on a side opposite to the surface on which the rotational polygon minor is disposed in relation to the rotational polygon mirror in a direction of the rotation shaft, and on which the light beam reflected by the reflection mirror and passing outside of the wall in the direction of the rotation shaft is incident; and
a shielding portion disposed between the second lens and an optical path of the light beam between the rotational polygon mirror and the wall configured to shield the second lens such that an air flow generated by the deflecting device does not collide against the second lens directly from a space between the wall and the deflecting device.

2. The optical scanning apparatus according to claim 1, further comprising a holding portion configured to hold the second lens.

3. The optical scanning apparatus according to claim 2, wherein the shielding portion and the holding portion are formed with a single member, and,
wherein the member is bent and includes an opening through which the light beam reflected by the reflection minor passes.

4. The optical scanning apparatus according to claim 3, further comprising a housing that accommodates the deflecting device, the first lens, and the second lens,
wherein the shielding portion and the holding portion are made of a material having a higher coefficient of thermal conductivity than the material of the housing.

5. The optical scanning apparatus according to claim 4, wherein the shielding portion and the holding portion and the second lens are configured to be movable integrally within a plane perpendicular to the optical axis of the second lens.

6. An image forming apparatus including the optical scanning apparatus according to claim 1, the image forming apparatus comprising:
the photosensitive member;
a developing unit configured to develop a latent image formed on the photosensitive member and generate a toner image;
a transferring unit configured to transfer the toner image onto a recording medium; and
a fixing unit configured to fix the toner image on the recording medium.

7. An optical scanning apparatus comprising:
a light source configured to emit a light beam;
a deflecting device including a rotational polygon mirror that deflects the light beam from the light source such that a photosensitive member is scanned with the light beam deflected by the rotational polygon mirror;
a first lens configured to pass therethrough the light beam deflected by the rotational polygon mirror;
a wall disposed between the first lens and the deflecting device;
a mirror configured to reflect the light beam that has passed through the first lens;
a second lens disposed above the deflecting device, the second lens being disposed between the deflecting device and the wall in a direction perpendicular to a rotation shaft of the rotational polygon mirror, and the second lens on which the light beam reflected by the mirror and passing over the wall is incident; and
a shielding member configured to support the second lens, to split an air flow generated by the deflecting device and directed from a space between the wall and the deflecting device toward the second lens, and to direct the air flow away from the second lens.

8. An image forming apparatus including the optical scanning apparatus according to claim 7, the image forming apparatus comprising:
the photosensitive member;
a developing unit configured to develop a latent image formed on the photosensitive member and generate a toner image;
a transferring unit configured to transfer the toner image onto a recording medium; and
a fixing unit configured to fix the toner image on the recording medium.

* * * * *